(12) United States Patent
Reid

(10) Patent No.: US 9,715,796 B2
(45) Date of Patent: Jul. 25, 2017

(54) COMMUNICATING CIRCUIT BREAKER ARCHITECTURE WITH AUTOMATIC LOAD CENTER POSITION IDENTIFICATION

(71) Applicant: SCHNEIDER ELECTRIC USA, INC., Palatine (IL)

(72) Inventor: Paul A. Reid, Cedar Rapids, IA (US)

(73) Assignee: Schneider Electric USA, Inc., Andover, MA (US)

( * ) Notice: Subject to any disclaimer, the term of this patent is extended or adjusted under 35 U.S.C. 154(b) by 113 days.

(21) Appl. No.: 14/881,857

(22) Filed: Oct. 13, 2015

(65) Prior Publication Data
US 2017/0103626 A1    Apr. 13, 2017

(51) Int. Cl.
G08B 21/00 (2006.01)
G08B 5/36 (2006.01)
H01H 71/02 (2006.01)

(52) U.S. Cl.
CPC ............. *G08B 5/36* (2013.01); *H01H 71/02* (2013.01)

(58) Field of Classification Search
CPC .... H01H 71/02; H01H 73/12; H01H 2300/03; H01H 9/167; H02J 13/0065
USPC ........................................................ 340/638
See application file for complete search history.

(56) References Cited

U.S. PATENT DOCUMENTS

| | | | | |
|---|---|---|---|---|
| 4,101,746 A | * | 7/1978 | Grieger | H01H 33/34 200/308 |
| 5,455,760 A | * | 10/1995 | Bilas | H02H 3/00 700/22 |
| 5,877,691 A | * | 3/1999 | Suptitz | H01H 71/0228 340/638 |
| 5,892,449 A | * | 4/1999 | Reid | H02J 13/001 340/638 |
| 9,054,516 B2 | * | 6/2015 | Watford | H02H 3/04 |
| 2007/0135971 A1 | | 6/2007 | Andarawis et al. | |
| 2008/0013596 A1 | | 1/2008 | Dunne et al. | |
| 2010/0164744 A1 | * | 7/2010 | Parker | H04B 10/802 340/12.22 |

(Continued)

FOREIGN PATENT DOCUMENTS

GB    2474037    4/2011

OTHER PUBLICATIONS

Extended European Search Report for EP Patent Application No. 16190152.5, dated Feb. 15, 2017, 5 pages.

*Primary Examiner* — Eric M Blount
(74) *Attorney, Agent, or Firm* — Locke Lord LLP

(57) ABSTRACT

A communicating circuit breaker architecture with automatic load center position identification links circuit breakers having electronics for reporting a self-status signal including operating data and a position identifier. Each breaker has light pipes with optical ports at its sides for communicating with its neighbors and preferably a mechanically operated optical shunt providing an optical path through the breaker in the event of a trip. Each breaker has optical data transceivers for the light pipes which transmit self-status information through the light pipes and receive and repeat neighboring breaker status signals to its neighbors. The breakers form a network via their aligned optical ports reporting to an aggregator device in a known position of the Load Center which transmits breaker status reports outside the load center. Each breaker has a logic unit for determining its position in the load center based on the received position of a neighboring device.

10 Claims, 5 Drawing Sheets

(56) References Cited

U.S. PATENT DOCUMENTS

| | | |
|---|---|---|
| 2014/0233160 A1 | 8/2014 | Ferri et al. |
| 2014/0340822 A1 | 11/2014 | Lal et al. |
| 2016/0099749 A1* | 4/2016 | Bennett .................... H04B 3/54 375/257 |
| 2016/0188763 A1* | 6/2016 | Beiner ................ G06F 17/5009 703/18 |

* cited by examiner

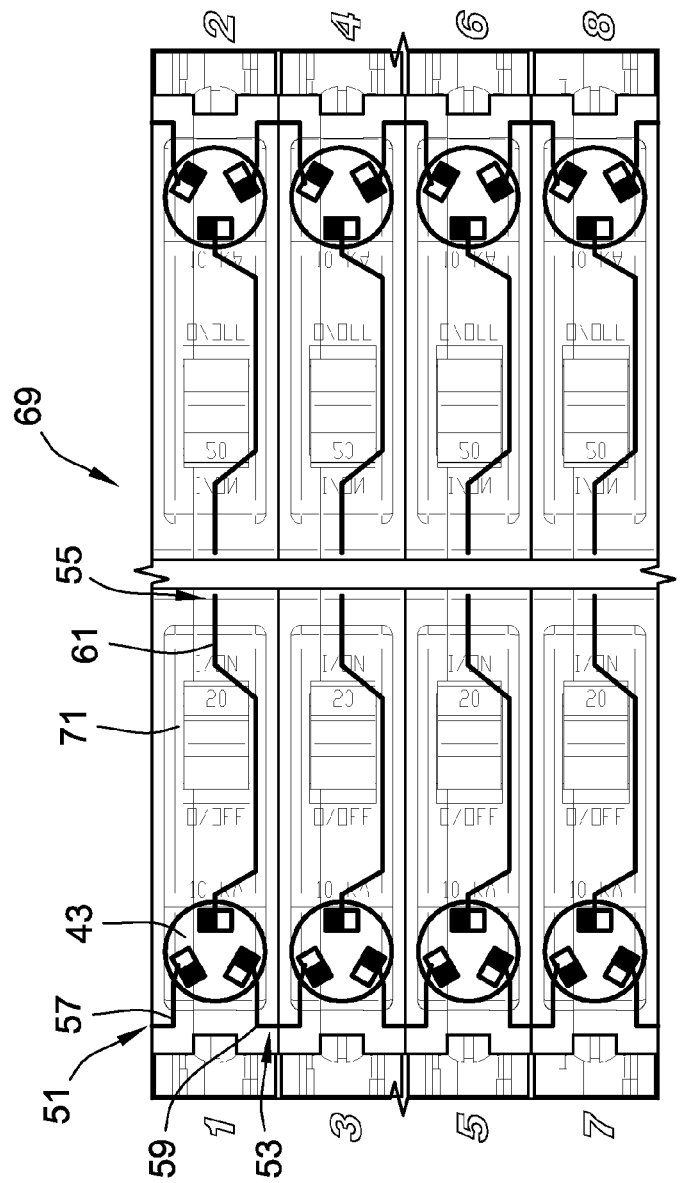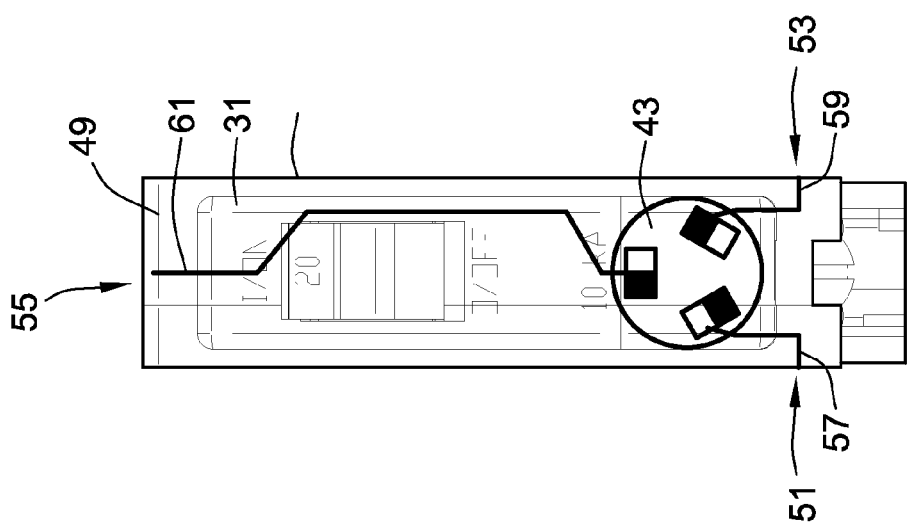
FIG. 2B
FIG. 2A

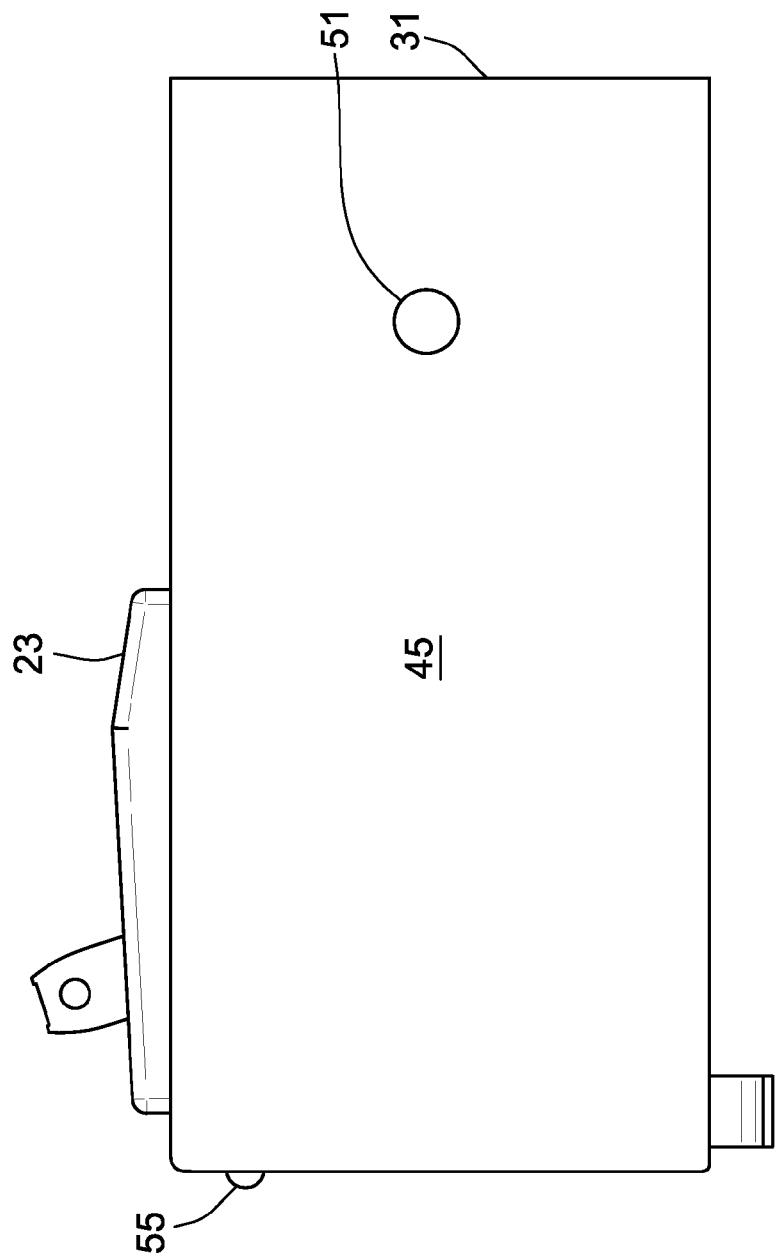

COMMUNICATING CIRCUIT BREAKER ARCHITECTURE WITH AUTOMATIC LOAD CENTER POSITION IDENTIFICATION

BACKGROUND

Field of the Invention

The present invention relates to systems for panelboards capable of communicating operations data from the branch circuits to beyond the panelboard; and more particularly to load centers populated with electronic circuit breakers which communicate through an optical network among the breakers to an aggregator which sends data outside the load center.

Discussion of the Related Art

With the rise of functionality for miniature circuit breakers and increasing emphasis on smart grid technology, there is a desire for more data concerning branch circuits to be available from the load center. Several types of information might be gathered including the operational data of the branch circuit or the type of electrical fault which caused a breaker to trip. In many instances this information is desired to be exported from the load center. In particular, a desirable feature is to communicate data from the individual circuit breakers defining the branch circuits to outside systems, thus supplying information of interest to the end user or other entities.

Accordingly, several schemes have been advanced for managing data from the load center. However, past schemes have been burdened with complexities in implementing such a system. The data transfer from each individual circuit breaker to the main communication unit, commonly referred to as the aggregator, should be implemented without adding significant complexity to the equipment or installation of such a system.

SUMMARY

The system of the present invention operates by allowing communication directly between each circuit breaker and its neighbors. As is typical, the circuit breakers in a panel are mounted such that there is a neighboring circuit breaker facing at least two of its left, right, and front walls. Each circuit breaker of the present invention incorporates multiple optical communications interfaces that are aligned with identical optical communications interfaces, i.e. optical ports, on the neighboring circuit breakers. The arrangement of optical interfaces allows data to be passed from and through each circuit breaker to the aggregator, with individual circuit breakers acting as nodes on a mesh network. The aggregator collects all data from the breakers and communicates it outside the load center. Since communications between the circuit breakers use optical methods, the circuit breakers are installed and operated without the need for any additional connections, panel modifications, or changes to the circuit breaker installation procedure.

According to some aspects of the present invention, the complexity of the system is minimized by containing the communications means within the load center entirely within the circuit breakers. Each circuit breaker is designed to communicate its branch's operating status with its neighbors using an optical means, thus no connections between circuit breakers or panel modifications are required. The position of the circuit breaker in the panel is determined automatically by each individual circuit breaker from the positions of its neighbors without need for further set up procedures.

Thus, because the improvements of the present system are centered around the improvements to the circuit breaker devices themselves, aspects of the present invention may be suitable for retro-fit applications using existing panel boards already installed in the field.

According to some aspects of the present invention, each breaker has left and right side light pipes, i.e. fiber optic links, ending at optical ports through the breaker side walls at one end and at optical transceivers within the breakers at another end, with the optical transceiver including one or more optical transceivers to enable the passing of information through a mesh network with each active breaker acting as a node. Network messages might be relayed using either of a flooding technique or a routing technique depending upon the electronics overhead and other design constraints. Each breaker has a self-status report generator to encode its branch's information which is connected to the transceiver. The transceiver also accepts and repeats neighboring breaker status reports to its light pipes until all breaker information has reached the aggregator. In cases where a breaker has no power to its transceivers due to a trip event or being turned off, an optical shunt may be mechanically placed between at least the left side and right side light pipes to allow a pass through of the optical data stream.

According to some aspects of the present invention an electronic circuit breaker with a case, separable electrical contacts, and electronic sensing/data apparatus, has an optical data transceiver; electronics for encoding and reporting a self-status signal including operating data and a position identifier of the circuit breaker to the optical data transceiver; left and right, and preferably front, side optical ports in the case, each optical port leading to a respective light pipe, each light pipe connected to the optical data transceiver for transmitting the self-status signal through one of the light pipes; the optical data transceiver further capable of receiving and repeating neighboring breaker status signals through the light pipes; a logic unit for identifying the position of the breaker in the load center based on a received position identifier of a neighboring device position; and preferably a mechanically operated optical shunt for providing an optical communication path through the breaker when unpowered as a result of separating the electrical contacts.

In other aspects of the present invention a load center with a plurality of such electronic circuit breakers will be placed with aligned optical ports and include an aggregator which formats the status reports for a transmitting means for moving the status reports of the breakers outside the load center enclosure by any suitable means, e.g., wired or wireless.

BRIEF DESCRIPTION OF THE DRAWINGS

The foregoing and other advantages of the disclosed embodiments will become apparent upon reading the following detailed description and upon reference to the exemplary drawings according to one or more embodiments disclosed herein, wherein:

FIG. 2A is a front view of an exemplary breaker and FIG. 2B is a front view of a group of exemplary breakers in a load center.

FIG. 3 is a left side view of an exemplary circuit breaker.

FIG. 5 is a front side view of an exemplary circuit breaker.

DETAILED DESCRIPTION OF THE DISCLOSED EMBODIMENTS

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Figure 1:
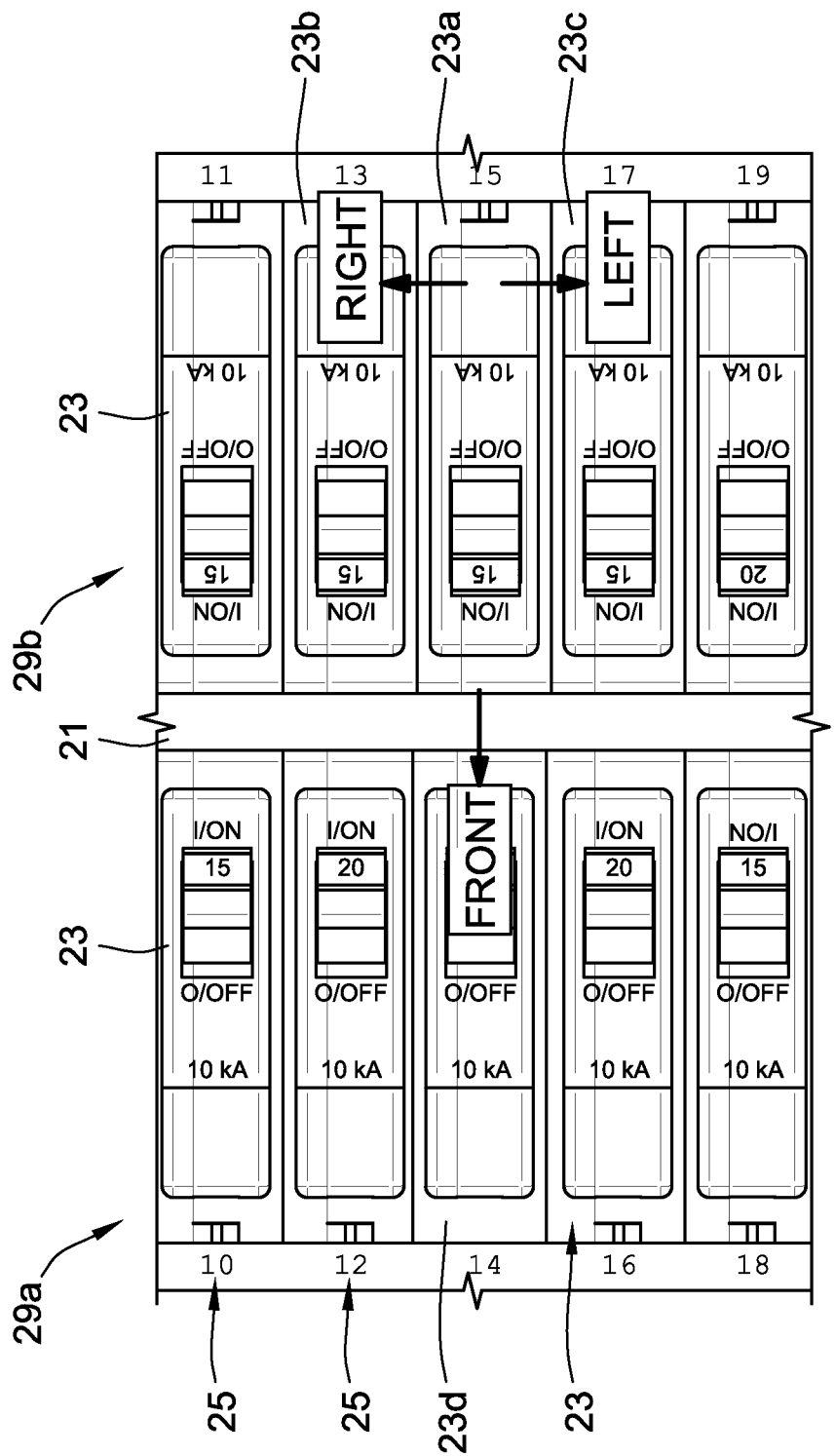
FIG. 1 is a front view of a load center panel populated with electronic miniature circuit breakers.
Figure 4:
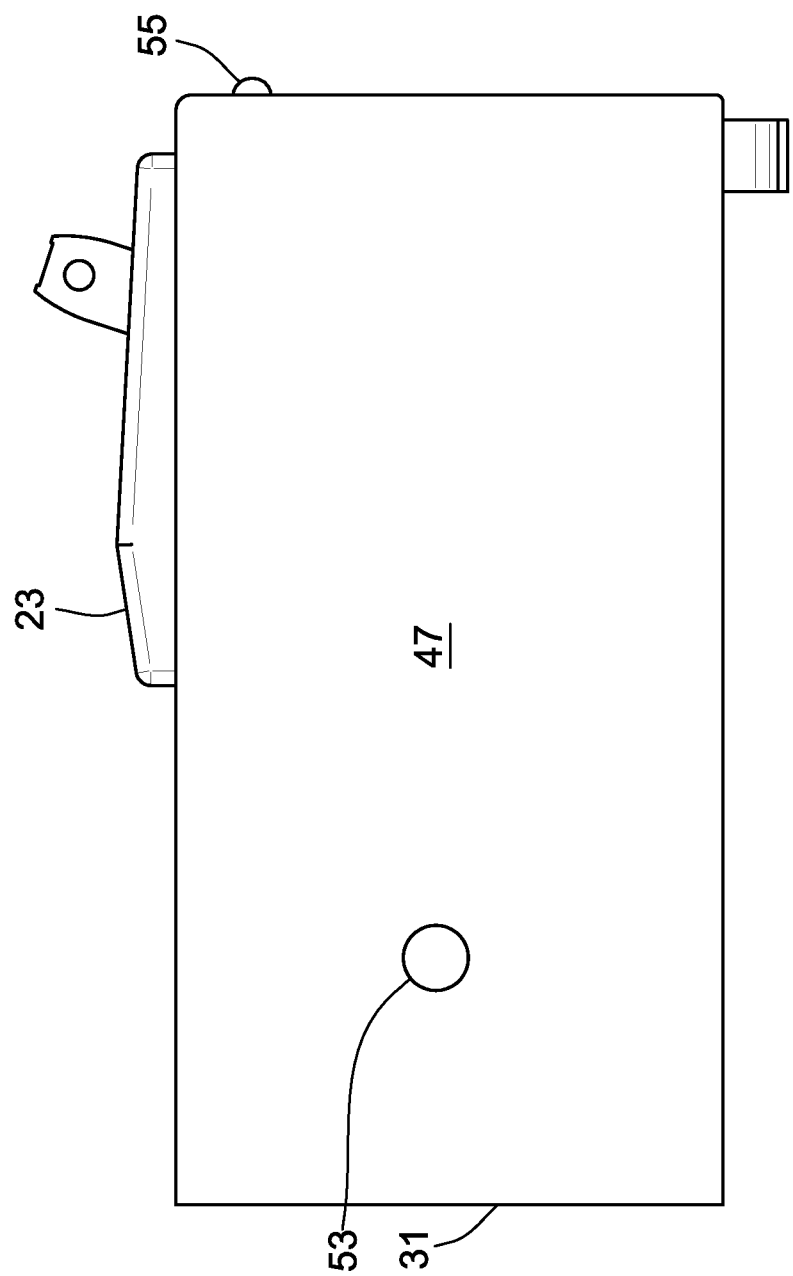
FIG. 4 is a right side view of an exemplary circuit breaker.

By studying the drawings, and with particular reference to FIG. 1, persons of ordinary skill in the art will understand that they are looking at a panel board represented by a load center 21 with its individual slot positions populated by miniature circuit breakers (sometimes referred to just as "breakers") collectively 23. As known, the slot positions are typically referred to by numbers, collectively 25, which can be stamped into the faceplate of the enclosure 27 of the load center 21 as shown. The breakers 23 are arranged in two closely spaced columns 29a, 29b. Even-numbered positions are in one column while odd-numbered positions are in the adjacent column. In such an arrangement, it will noted that most breakers, such as an exemplary circuit breaker 23a, having neighboring breakers to the right 23b, left 23c, and front 23d sides of the subject breaker 23a. While illustrated and described in the context of residential load centers, it will be understood the present invention is applicable to commercial and industrial load centers and panel boards, OEM circuit breaker panel applications, and any enclosure containing multiple circuit breakers where communications are used.

Figure 6:
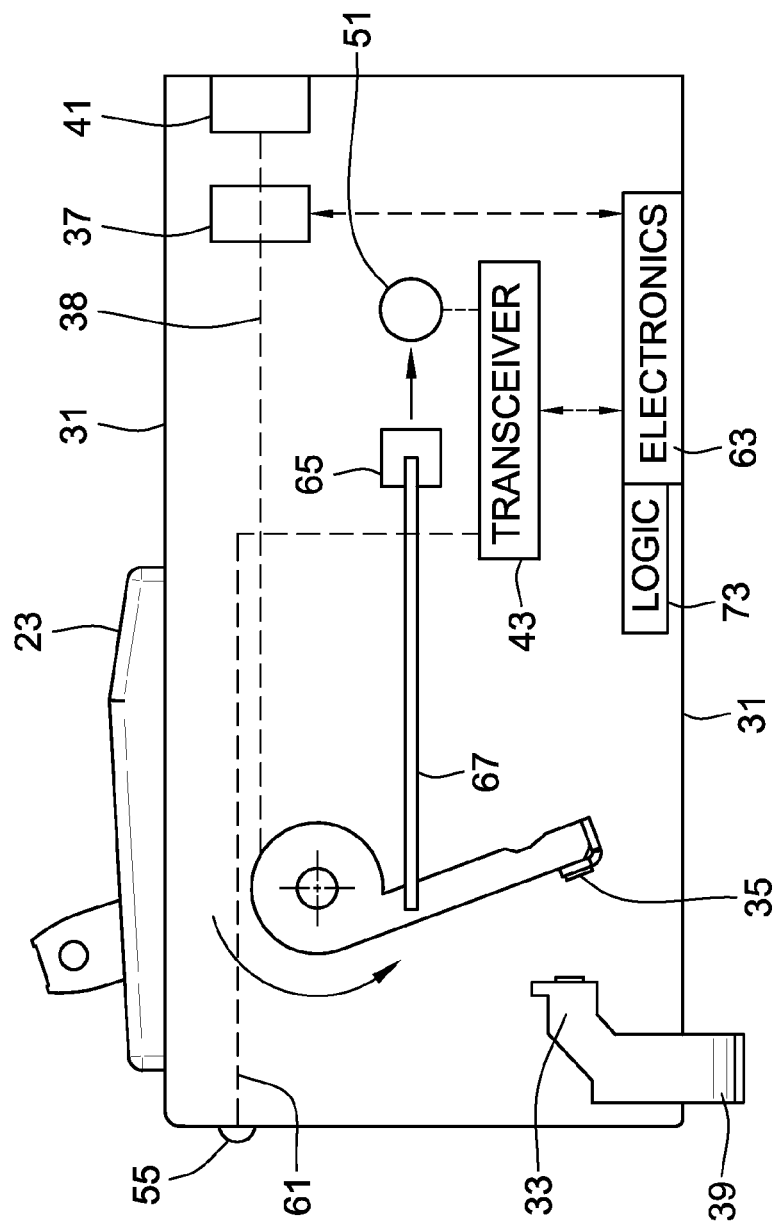
FIG. 6 is a schematic side view illustration of an exemplary optical shunt for an unpowered circuit breaker.

As seen especially in FIG. 6, each electronic circuit breaker 23 will have a case 31, separable electrical contacts being a fixed contact 33 and movable contact 35, and sensing/data gathering apparatus 37 (such as current transformer or the like on the current path 38 and associated electronics), between its line side terminal 39 and load side terminal 41, as commonly known in the art. Of particular interest to aspects of the present invention, each exemplary breaker 23 can be equipped with an optical data transceiver 43 (FIG. 2A). In the left wall 45, right wall 47, and front wall 49 of the case 31 are located optical ports 51, 53, 55, respectively. The optical ports are placed in fixed positions for allowing optical signals through the case walls and may include lensing if desired. Each optical port leads to a respective light pipe, 57, 59, 61, respectively, with each light pipe contained inside the case 31 and connected to the optical data transceiver 43 or individual operating portion thereof, as hardware and design may dictate. It will be appreciated that a two pole breaker could, for example, have two forward optical ports to communicate with two forward wall neighbors. It is noted that not all panel boards are two column designs and the front optical port 55 and light pipe 61 may not be strictly required in a one column design where the subject breaker lacks a front-neighboring circuit breaker.

The electronics 63 (FIG. 6), or subset thereof, for each breaker 23 are capable of encoding and reporting a self-status signal including operating data and a position identifier of the circuit breaker to the optical data transceiver 43. The transceiver of each breaker is capable of both transmitting the self-status signal of the breaker through one or more of its light pipes to an optical port, especially the ones facing a position towards the aggregator; and is capable of receiving and acting as a repeater, repeating the neighboring breaker status signals through the light pipes and out of the optical ports to neighboring breakers so that each breaker can act as a node in a mesh network of the installed array of breakers.

Referring particularly to FIG. 2B, a grouping of circuit breakers 69 in positions 1-8 of the load center is shown with the aggregator unit 71 in position one. The aggregator may be included in a functional breaker unit or be a unit sized for a breaker slot but dedicated only to the aggregator function. As illustrated, the aggregator 71 is equipped with each of the three regularly positioned optical ports, 51, 53, 55, i.e. front wall and side walls, and its own optical data transceiver 43 and light pipes 57, 59, 61. The output of the aggregator as illustrated is through the left wall optical port 51 which might then be received by any desired transmission apparatus for forwarding on the load center data to a remote location, e.g. wired or wireless RF or the like. The output of the aggregator could also be produced by a self-contained RF transceiver within the aggregator or a wired network connection on the aggregator.

Each circuit breaker can identify the position of its neighbors by communicating with them, i.e. receiving the neighbors' position information. When the load center is commissioned or powered on, only the aggregator knows its position, which could be position number 1 by default or the position information could be settable. Identification then automatically propagates down the panel by use of a logic unit 73 in each breaker, e.g. as a part of the electronics package 63 of the breakers. Logically, the circuit breaker with a front-side neighbor in position number 1 knows it is in position number 2, the breaker with number 2 on the right knows it is number 4, the breaker with number 4 in front of it knows it is number 3, the breaker with number 3 on its left knows it is number 5, etc.

Figure 7:
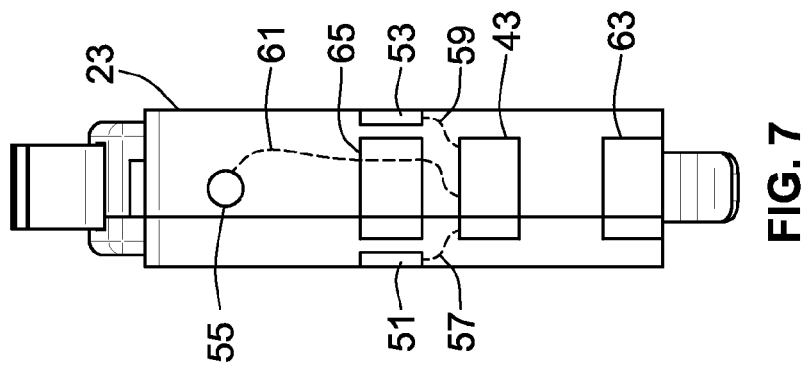
FIG. 7 is a schematic end view illustration of an exemplary optical shunt for an unpowered circuit breaker.

Referring particularly to FIGS. 6 and 7, in order to prevent unpowered breakers from interrupting the data stream, the breakers are provided with a mechanically operated optical shunt 65 linked to the movable contact 35 for providing an optical communication path through the breaker as a result of separating the electrical contacts. When the circuit breaker contacts 33, 35 open due to a trip or being switched off, a mechanical linkage 67 drives the optical shunt 65 between the left and right side optical ports 51, 53 of the circuit breaker 23. This allows pass-through communications.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the scope of the disclosed embodiments as defined in the appended claims.

The invention claimed is:

1. An electronic circuit breaker with a case and separable electrical contacts, having:
   a) an optical data transceiver;
   b) electronics for encoding and reporting a self-status signal including operating data and a position identifier of the circuit breaker to the optical data transceiver,
   c) left and right side optical ports in the case, each optical port leading to a respective light pipe, each light pipe connected to the optical data transceiver for transmitting the self-status signal through one of the light pipes to an optical port, the optical data transceiver further capable of receiving and repeating neighboring breaker status signals through the light pipes to one of the optical ports; and
   d) a logic unit for identifying the position of the circuit breaker in the load center based on a received position identifier of a neighboring breaker position.

2. The electronic circuit breaker according to claim 1 further comprising: a mechanically operated optical shunt for providing an optical communication path through the breaker as a result of separating the electrical contacts.

3. The electronic circuit breaker according to claim 1 wherein the optical data transceiver includes a transceiver section for each light pipe.

4. The electronic circuit breaker according to claim 1 wherein a front wall of the case has an optical port and a corresponding light pipe for transmitting the self-status, the optical data transceiver further capable of receiving and repeating neighboring breaker status signals through the light pipes to one of the optical ports.

5. The electronic circuit breaker according to claim 4 wherein the optical data transceiver includes a transceiver section for each light pipe.

6. A load center comprising:
   a plurality of electronic circuit breakers, each breaker having:
   a case;
   an optical data transceiver;
   electronics for encoding, and reporting a self-status signal including operating data and a position identifier of the circuit breaker to the optical data transceiver,
   left and right side optical ports in the case, each optical port leading to a respective light pipe, each light pipe connected to the optical data transceiver for transmitting the self-status signal through one of the light pipes to an optical port, the optical data transceiver further capable of receiving and repeating neighboring breaker status signals through the light pipes to one of the optical ports, and
   a logic unit for identifying the position of the breaker in the load center based on a received position identifier of a neighboring device position with the optical ports of neighboring breakers being aligned;
   a load center enclosure; and
   an aggregator which receives and transmits the self-status signals to a remote communication means for moving status reports outside the load center enclosure.

7. The electronic circuit breaker according to claim 1 further comprising: a mechanically operated optical shunt for providing an optical communication path through the breaker as a result of separating the electrical contacts.

8. The electronic circuit breaker according to claim 1 wherein the optical data transceiver includes a transceiver section for each light pipe.

9. The electronic circuit breaker according to claim 1 wherein a front wall of the case has an optical port and a corresponding light pipe for transmitting the self-status signal through one of the light pipes to an optical port, the optical data transceiver further capable of receiving and repeating neighboring breaker status signals through the light pipes to one of the optical ports.

10. The electronic circuit breaker according to claim 9 wherein the optical data transceiver includes a transceiver section for each light pipe.

* * * * *